D. T. McCARTHY.
VALVE.
APPLICATION FILED MAR. 12, 1914.
1,149,527.
Patented Aug. 10, 1915.
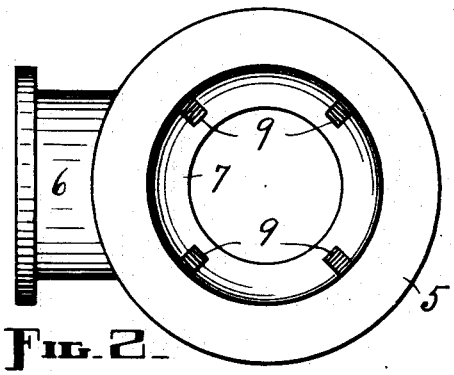
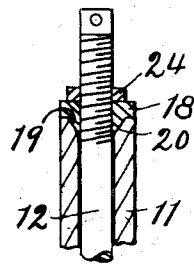
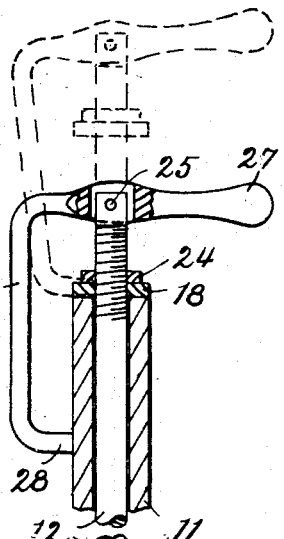
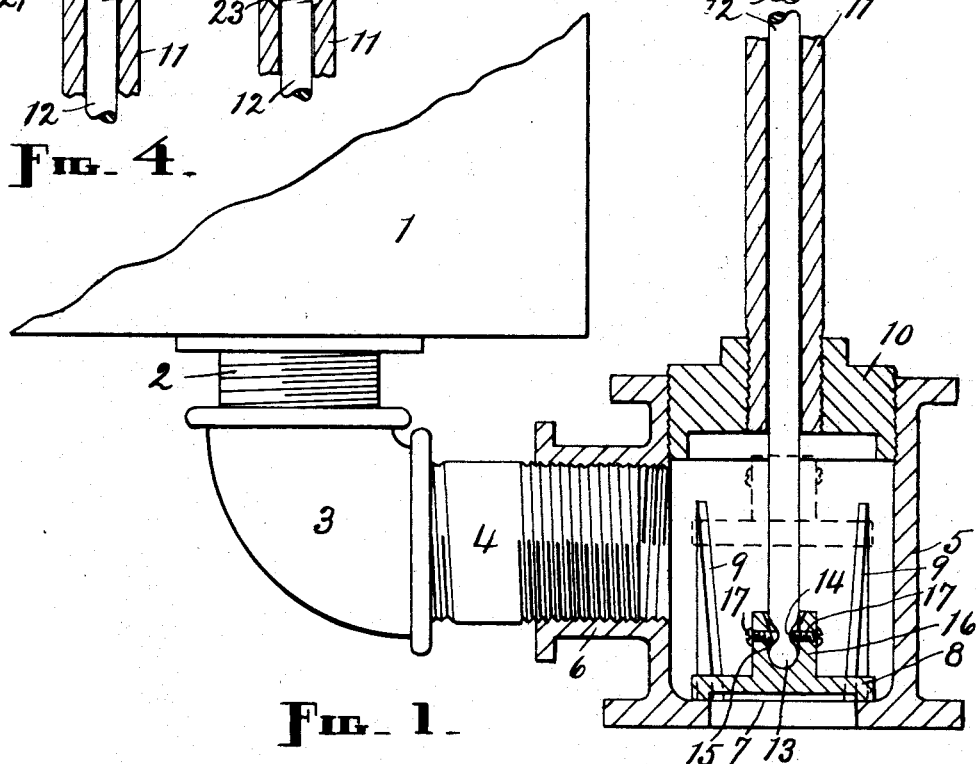
WITNESSES:
A. C. Fairbanks.
H. D. Cutter.
INVENTOR.
Daniel T. McCarthy,
BY
Webster & Co.
ATTORNEYS.

UNITED STATES PATENT OFFICE.

DANIEL T. McCARTHY, OF MERIDEN, CONNECTICUT.

VALVE.

1,149,527.     Specification of Letters Patent.     Patented Aug. 10, 1915.

Application filed March 12, 1914. Serial No. 824,134.

*To all whom it may concern:*

Be it known that I, DANIEL T. MCCARTHY, a citizen of the United States of America, residing at Meriden, in the county of New Haven and State of Connecticut, have invented a new and useful Valve, of which the following is a specification.

My invention relates to improvements in discharge valves for laundry washers or tubs, and consists of a certain peculiar valve construction, including a latch for retaining the valve proper in its open position, all as hereinafter set forth.

Much difficulty has heretofore been experienced with valves of this class or for this purpose, owing to the fact that they very soon leak, such defect being due to various causes, such as wear, the action of the hot water which such valves are used to control, the lodgment of foreign substances on the valve-seats between the latter and the valves proper, and faulty valve construction generally.

The primary object, therefore, of my invention is to produce a simple but strong and durable valve which, while being capable of quick and easy operation, is not liable to leak when closed, even after a long period of use, such valve being of the all-metal, gravity, self-seating type that requires little or no attention, and seldom needs repairing.

Further objects are to provide such a valve with a seal to prevent leakage around the valve-stem at the place where such stem emerges from its tubular guide or support, and with a convenient latch for holding the valve open.

These and other objects and advantages I attain and secure by the means illustrated in the accompanying drawings, in which—

Figure 1 is a vertical section through a valve which embodies a practical form of my invention, the valve being shown closed in full lines and open by dotted lines; Fig. 2, a top plan of the valve-seat casing; Fig. 3, a view showing a slightly modified form of seal; Fig. 4, a similar view of another modification of the seal, and, Fig. 5, a view of still another modification.

Similar numerals designate similar parts throughout the several views.

In the first view one corner of a washer is represented at 1, and connected with this, by means of a nipple 2, an elbow 3, and a short length of pipe 4, is a casing 5. The latter forms a part of my valve.

The pipe 4 opens through an extension 6 on one side of the casing 5, and said casing opens at the bottom through a valve-seat 7 with which the casing is provided in the interior at the base. A disk valve 8, of usual and well-known construction, is provided for the valve-seat 7, and a plurality of tapering or wedge-shaped guides 9 is provided in the casing 1 for said valve. There may be four, more or less, of the guides 9, and they are located within the casing 1 on the side wall or walls thereof, and each has its widest part at the base, which is on the valve-seat 7, and from there tapers to practically nothing at the top, where the inner face of the guide coincides with the inside surface of said casing. The inner edges of the bases of the guides 9 coincide with the outer circumference of the valve-seat 7, or with a circle the diameter of which is the same as that of the valve 8. Thus it will be seen that the valve 8 in descending is positively and accurately directed to its seat by exterior means consisting of the guides 9.

The valve-seat 7 forms the lowest interior part of the casing 1, and such seat has no upward projections, wherefore no opportunity is afforded for any sediment or foreign substance, or any article such as a pin or button, to collect or lodge in the bottom of said casing or on said seat, and by its presence prevent the valve from closing tightly.

The top of the casing 1 is closed by means of a screw-plug 10.

Screwed at the base tightly and securely into the center of the screw-plug 10 is a tubular support and guide 11 for a valve-stem 12, the middle portions of both tube and stem being broken out, in Fig. 1. The axial centers of the valve-seat 7 and valve-stem guide and support 11 are in line with each other. The valve-stem 12 is designed to slide freely in the guide and support 11 and extends above and below the same. The valve 8 is attached to the inner or bottom end of the stem 12.

The means of attachment or connection between the valve 8 and its stem 12 should be of such a nature as to leave said valve free to an extent sufficient to enable the same always to seat itself fully and properly, especially in the event of wear or in case said seat is not absolutely level, and to this end some form of universal or flexible joint is preferably provided. In this case the valve-stem 12 has a spherical base 13 with an annular groove 14 above, and this base is received in an opening 15 made in a hub 16 on said valve, and two screws 17 are inserted in said hub from opposite sides. The hub 16 rises from the axial center of the valve 8, and the screws 17 are tapped into and through said hub laterally, enter the opening 15, and engage the base of the valve-stem 12 above the part 13, the inner ends of said screws being in the groove 14. Thus ample provision is made for a rocking motion of the valve relative to its stem, and for said valve to rotate on said stem.

Since the valve 8 closes by gravity, or by its own weight and that of the attached and connected parts and members, as will be clearly understood, and the valve-stem 12 can have at the most only a loose fit in the tube 11, and may be much smaller in diameter than the interior of said tube, hot water and steam from the washer 1 would escape from the upper end of said tube, around said valve-stem, when the valve 8 is closed, in the absence of some means to close or seal such end at such time. I therefore provide the valve-stem 12 with a disk or plate which constitutes a seal 18 for the tube 11.

The seal 18 may be made flat on the underside to rest or bear on the upper edge of the tube 11, as shown in Fig. 1, or it may be made in various other ways, examples of which are illustrated in Figs. 3, 4 and 5. In Fig. 3 the seal 18 has a conical bottom piece 19 to fit a conical seat 20 formed at the top of the tube 11; while in Fig. 4 the seal is provided with a depending flange 21 which, with the horizontal portion of said last-mentioned seal, incloses the upper terminal of the tube, around the valve-stem 12, when the seal is closed. The seal 18, shown in the last view, has an annular groove 22 in the underside, into which groove is received the upper edge of the tube 11, when said seal is closed. In this last case the upper terminal of the tube 11 is chambered, as shown at 23, unless the diameter of the valve-stem 12 is very much less than that of the interior of said tube.

The seal 18, whatever its particular formation may be, must be so located on the valve-stem 12 that, when the valve 8 is closed, said seal is also closed, or, in other words, said seal then bears on the top of the tube 11 and so prevents leakage or the escape of water or steam at that point. The upper terminal portion of the valve-stem 12, therefore, is screw-threaded to receive the seal 18, which latter is also screw-threaded on the inside, and to receive a set-nut 24. The seal 18 is first properly adjusted on the threaded portion of the valve-stem 12, and then the set-nut 24 is screwed down tightly onto said seal to prevent the latter from working loose.

Pivotally attached at 25 to the upper terminal of the valve-stem 12 is an angular latch 26, which has a projection at the top to form a handle 27, and an inwardly-extending member or nose 28 at the lower end to engage the upper end of the tube 11, when the parts are elevated, and retain them in that position. The handle 27 affords convenient means for operating the valve 8 and the latch 26.

Normally the parts stand as shown by full lines in Fig. 1, with the valve-seat 7 closed by the valve 8, and the tube 11 at its upper end closed by the seal 18. With the movable parts thus disposed the latch 26 is inoperative, its nose 28 resting against the adjacent side of the tube 11. No leakage from the discharge end of the washer 1 is now possible.

When it is desired to empty the washer 1, the handle 27 is grasped and by means of the same the valve-stem 12, to which said handle or the latch of which said handle forms a part is pivoted, is elevated and the valve 8 lifted from the seat 7. After carrying the latch 26 high enough to enable the nose 28 to clear the top of the tube 11, said latch is swung on the pivot 25, by means of the handle 27 which is still in the grasp of the operator, to position said nose above said tube, and then the parts are permitted to descend until said nose bears on the tube, if necessary, and said handle is released. The nose 28 of the latch 26 is thus left resting on the top of the tube 11, and the valve 8 is thereby retained in wide open position, through the medium of said latch, the pivot 25, and the valve-stem 12. While the valve 8 is thus open, the liquid contents of the washer 1 is permitted to flow freely through the connections, between said washer and the casing 5, into the latter and out of the same through the valve-seat. Necessarily and incidentally the seal 18 is carried up with the valve-stem 12 and away from the tube 11, at the time the valve 8 is opened, and retained with said valve in inoperative or open position, but this has no significance and produces no effect, because the liquid flows down through the valve-seat 7 without any tendency to rise into said tube around said stem and escape in that way, owing to the large exit below and the comparatively small exit above. After all of the water has escaped from the washer 1, and before more water is turned into said washer, the valve 8 and the seal 18 are closed, by again grasping the handle 27, rocking the latch 26 outwardly or away from the valve-stem 12 to remove the nose 28 from its position on and above the tube 11, and permitting said stem with the parts carried thereby to descend. The outlet from the washer 1 is now closed and so remains until the valve-opening operations are repeated.

More or less change in the shape, size, arrangement and construction of other parts of the valve, besides those previously pointed out in connection with the seal, may be made without departing from the spirit of my invention.

What I claim as my invention, and desire to secure by Letters Patent, is—

1. In a valve, of the class described, a casing having a valve-seat therein, a valve for such seat, a stem for such valve, a supporting and guiding member for such stem, and an angular latch pivotally attached to said stem and having a part that is adapted to be actuated into engagement with said member, when said stem is elevated, to retain said stem with said valve in elevated position.

2. In a valve, of the class described, a casing having a valve-seat therein, a valve for such seat, a tubular member rising from said casing, a stem for said valve, such stem operating through and loosely fitting said member, a seal carried by said stem for said member and adapted to fit directly onto and close completely the upper end of said tube around said stem, and an angular latch pivotally attached to said stem, said latch having a part that is capable of being actuated into engagement with said member, when said stem is elevated, to retain said stem with said valve in elevated position.

3. The combination, in a valve, of the class described, with a casing having a valve-seat therein, and a tube rising from said casing and of smaller diameter than the latter, of a valve for said seat, a valve stem extending through and loosely fitting said tube, a flexible joint between said valve and stem, and a seal adjustably mounted on said stem for the upper end of said tube, when said stem is down and said valve closed, said seal being adapted to fit directly onto and completely close said upper end of said tube around said stem.

4. The combination, in a valve, of the class described, with a casing having therein a valve-seat, and a tube rising from said casing, of a valve for said seat, a stem extending through said tube for said valve, and an angular latch pivotally attached to said stem and having a part that is adapted to be actuated into engagement with said tube, when said stem is elevated, and to retain said stem with said valve in elevated position.

5. The combination, in a valve, of the class described, with a casing having a valve-seat, and a tube rising from said casing, of a valve for said seat, a stem extending through said tube for said valve, and a latch pivotally attached to said stem and having a tube-engaging part and a handle.

DANIEL T. McCARTHY.

Witnesses:
JOHN E. McCARTHY,
J. P. McCARTHY.

Copies of this patent may be obtained for five cents each, by addressing the "Commissioner of Patents, Washington, D. C."